US012185082B2

(12) United States Patent
Hu et al.

(10) Patent No.: US 12,185,082 B2
(45) Date of Patent: Dec. 31, 2024

(54) PRIMARY-SECONDARY EAR SWITCHING METHOD AND APPARATUS FOR TWS EARPHONES IN COMMUNICATION SCENARIO, AND MEDIUM

(71) Applicant: GOERTEK INC., Shandong (CN)

(72) Inventors: Dezheng Hu, Shandong (CN); Baotong Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 329 days.

(21) Appl. No.: 17/790,607

(22) PCT Filed: Dec. 16, 2020

(86) PCT No.: PCT/CN2020/136969
§ 371 (c)(1),
(2) Date: Jul. 1, 2022

(87) PCT Pub. No.: WO2021/218190
PCT Pub. Date: Nov. 4, 2021

(65) Prior Publication Data

US 2023/0034046 A1 Feb. 2, 2023

(30) Foreign Application Priority Data

Apr. 27, 2020 (CN) ........................ 202010344017.4

(51) Int. Cl.
*H04S 7/00* (2006.01)
*H04R 3/00* (2006.01)

(52) U.S. Cl.
CPC ............... *H04S 7/304* (2013.01); *H04R 3/00* (2013.01); *H04R 2420/03* (2013.01); *H04R 2460/07* (2013.01)

(58) Field of Classification Search
CPC .... H04R 3/00; H04R 1/1016; H04R 2420/03; H04R 2460/07; H04R 2420/07; H04S 7/304
See application file for complete search history.

(56) References Cited

U.S. PATENT DOCUMENTS 10,200,791 B1 * 2/2019 Liu ........................ H04R 5/033
10,631,363 B1 4/2020 Xian et al.
(Continued)

FOREIGN PATENT DOCUMENTS

CN 107708006 2/2018
CN 107894881 A 4/2018
(Continued)

OTHER PUBLICATIONS

International Preliminary Report on Patentability received for PCT Patent Application No. PCT/CN2020/136969, mailed on Nov. 10, 2022, 12 pages (8 pages of English Translation and 4 pages of Original Document).
(Continued)

*Primary Examiner* — Jason R Kurr
(74) *Attorney, Agent, or Firm* — HAUPTMAN HAM, LLP

(57) ABSTRACT

A method and a device for switching a master earphone with a slave earphone of TWS earphones in a call scenario, and a medium are provided. In the method for switching a master earphone with a slave earphone of TWS earphones in a call
(Continued)

scenario according to the present disclosure, a signal indicating a position change of the master earphone being worn relative to a wearing part of the master earphone and a signal indicating a position change of the slave earphone being worn relative to a wearing part of the slave earphone are obtained; it is determined whether the signals meet a master-slave earphone switching condition; and in a case that the signals meet the master-slave earphone switching condition, the master earphone is controlled to operate in a slave earphone mode and the slave earphone is controlled to operate in a master earphone mode.

11 Claims, 5 Drawing Sheets

(56) References Cited

U.S. PATENT DOCUMENTS

| | | | | |
|---|---|---|---|---|
| 10,924,858 | B2 * | 2/2021 | Kraemer | H04R 1/1041 |
| 2009/0023417 | A1 * | 1/2009 | Davis | H04M 1/72513 455/403 |
| 2016/0210111 | A1 * | 7/2016 | Kraft | G06F 3/165 |
| 2016/0219358 | A1 | 7/2016 | Shaffer et al. | |
| 2017/0195769 | A1 | 7/2017 | Chang et al. | |
| 2017/0311105 | A1 * | 10/2017 | Hariharan | H04R 29/001 |
| 2018/0279038 | A1 * | 9/2018 | Boesen | H04W 76/10 |
| 2020/0045159 | A1 | 2/2020 | Wang | |
| 2020/0132716 | A1 * | 4/2020 | Zhang | G01P 15/125 |
| 2020/0169822 | A1 * | 5/2020 | Lovich | G10L 15/08 |
| 2021/0219041 | A1 | 7/2021 | Zhang et al. | |
| 2021/0377648 | A1 * | 12/2021 | Tome | H04R 1/1016 |

FOREIGN PATENT DOCUMENTS

| | | |
|---|---|---|
| CN | 108718467 A | 10/2018 |
| CN | 108882087 A | 11/2018 |
| CN | 108900939 | 11/2018 |
| CN | 109040446 A | 12/2018 |
| CN | 109040887 A | 12/2018 |
| CN | 109660975 A | 4/2019 |
| CN | 109743654 A | 5/2019 |
| CN | 110381485 | 10/2019 |
| CN | 110602675 | 12/2019 |
| CN | 111526440 A | 8/2020 |

OTHER PUBLICATIONS

International Search Report and Written Opinion received for PCT Patent Application No. PCT/CN2020/136969, mailed on Mar. 16, 2021, 9 pages (2 pages of English Translation and 7 pages of Original Document).

* cited by examiner

PRIMARY-SECONDARY EAR SWITCHING METHOD AND APPARATUS FOR TWS EARPHONES IN COMMUNICATION SCENARIO, AND MEDIUM

This application is a 371 of International Patent Application No. PCT/CN2020/136969, titled "PRIMARY-SECONDARY EAR SWITCHING METHOD AND APPARATUS FOR TWS EARPHONES IN COMMUNICATION SCENARIO, AND MEDIUM", filed on Dec. 16, 2020, which claims the benefit of and priority to Chinese Patent Application No. 202010344017.4, titled "PRIMARY-SECONDARY EAR SWITCHING METHOD AND APPARATUS FOR TWS EARPHONES IN COMMUNICATION SCENARIO, AND MEDIUM", filed on Apr. 27, 2020 with Chinese Patent Office, which are incorporated herein by reference in their entireties.

FIELD

The present disclosure relates to the technical field of earphones, and in particular to a method and a device for switching a master earphone with a slave earphone of TWS earphones in a call scenario and a medium.

BACKGROUND

With the development of the earphone technology, TWS (True Wireless Stereo) earphones emerge in the market due to the advantages such as free wearing and good sound quality, and the demand for the TWS earphones is growing exponentially. Generally, the TWS earphones include two earphones. The two earphones are respectively worn on the left ear and the right ear of the user, and are respectively called as a master earphone and a slave earphone in the art.

Each of the master earphone and the slave earphone is arranged with a microphone and a speaker. In a call scenario, although the microphone in the master earphone and the microphone in the slave earphone may be simultaneously turned on to collect voice, only the microphone in the master earphone transmits the collected voice due to that only one audio signal can be transmitted according the HFP protocol. Therefore, considering the power consumption, only the microphone in the master earphone is turned on in the call scenario. In this scenario, if two users participate in a conference call by using a same pair of TWS earphones and the two users are far apart, for example, 5 to 10 meters apart, the user wearing the slave earphone can only hear voice of others and cannot express suggestions and opinions, resulting in poor user experience.

Therefore, how to provide a method for switching a master earphone with a slave earphone is a problem to be urgently solved by those skilled in the art.

SUMMARY

According to the present disclosure, a method and a device for switching a master earphone with a slave earphone of TWS earphones in a call scenario, and a medium are provided, with which each of two users wearing a same pair of TWS earphones can perform voice collection with a microphone in an earphone worn by the user, thereby improving the user experience.

To solve the above technical problems, a method for switching a master earphone with a slave earphone of TWS earphones in a call scenario is provided according to the present disclosure. The method includes: obtaining a signal indicating a position change of the master earphone being worn relative to a wearing part of the master earphone and a signal indicating a position change of the slave earphone being worn relative to a wearing part of the slave earphone; determining whether the signals meet a master-slave earphone switching condition; and in a case that the signals meet the master-slave earphone switching condition, controlling the master earphone to operate in a slave earphone mode and controlling the slave earphone to operate in a master earphone mode.

Preferably, the obtaining a signal indicating a position change of the master earphone being worn relative to a wearing part of the master earphone and a signal indicating a position change of the slave earphone being worn relative to a wearing part of the slave earphone includes: obtaining a timestamp of the position change of the master earphone and a timestamp of the position change of the slave earphone.

Preferably, the determining whether the signals meet a master-slave earphone switching condition includes: in a case that the timestamp of the master earphone is equal to the timestamp of the slave earphone, determining that the signals do not meet the master-slave earphone switching condition; in a case that the timestamp of the master earphone is not equal to the timestamp of the slave earphone and the timestamp of the slave earphone is equal to 0, determining that the signals do not meet the master-slave earphone switching condition; in a case that the timestamp of the master earphone is not equal to the timestamp of the slave earphone, the timestamp of the slave earphone is not equal to 0 and the timestamp of the master earphone is earlier than the timestamp of the slave earphone, determining that the signals do not meet the master-slave earphone switching condition; and in a case that the timestamp of the master earphone is not equal to the timestamp of the slave earphone, the timestamp of the slave earphone is not equal to 0 and the timestamp of the master earphone is later than the timestamp of the slave earphone, determining that the signals meet the master-slave earphone switching condition.

Preferably, the obtaining a signal indicating a position change of the master earphone being worn relative to a wearing part of the master earphone and a signal indicating a position change of the slave earphone being worn relative to a wearing part of the slave earphone includes: obtaining an offset of the master earphone indicating the position change of the master earphone and an offset of the slave earphone indicating the position change of the slave earphone.

Preferably, the determining whether the signals meet a master-slave earphone switching condition includes: in a case that the offset of the master earphone is equal to the offset of the slave earphone, determining that the signals do not meet the master-slave earphone switching condition; in a case that the offset of the master earphone is not equal to the offset of the slave earphone and the offset of the slave earphone is not greater than a preset value, determining that the signals do not meet the master-slave earphone switching condition; in a case that the offset of the master earphone is not equal to the offset of the slave earphone, the offset of the slave earphone is greater than preset value and the offset of the master earphone is greater than the preset value, determining that the signals do not meet the master-slave earphone switching condition; and in a case that the offset of the master earphone is not equal to the offset of the slave earphone, the offset of the slave earphone is greater than a preset value and the offset of the master earphone is not greater than the preset value, determining that the signals meet the master-slave earphone switching condition.

Preferably, the obtaining a signal indicating a position change of the master earphone being worn relative to a wearing part of the master earphone and a signal indicating a position change of the slave earphone being worn relative to a wearing part of the slave earphone includes: obtaining an offset and a timestamp of the position change of the master earphone and an offset and a timestamp of the position change of the slave earphone.

Preferably, the determining whether the signals meet a master-slave earphone switching condition includes: in a case that the timestamp of the master earphone is equal to the timestamp of the slave earphone and the offset of the master earphone is equal to the offset of the slave earphone, determining that the signals do not meet the master-slave earphone switching condition; in a case that the timestamp of the master earphone is not equal to the timestamp of the slave earphone, the timestamp of the master earphone is equal to 0, the offset of the master earphone is less than a preset value, and the offset of the slave earphone is greater than the preset value, determining that the signals meet the master-slave earphone switching condition; in a case that the timestamp of the master earphone is not equal to the timestamp of the slave earphone, the timestamp of the master earphone is not equal to 0, the timestamp of the slave earphone is equal to 0, the offset of the master earphone is greater than a preset value, and the offset of the slave earphone is less than the preset value, determining that the signals do not meet the master-slave earphone switching condition; in a case that the timestamp of the master earphone is not equal to the timestamp of the slave earphone, the timestamp of the master earphone and the timestamp of the slave earphone are not equal to 0, and the timestamp of the master earphone is earlier than the timestamp of the slave earphone, determining that the signals do not meet the master-slave earphone switching condition; and in a case that the timestamp of the master earphone is not equal to the timestamp of the slave earphone, the timestamp of the master earphone and the timestamp of the slave earphone are not equal to 0, and the timestamp of the master earphone is later than the timestamp of the slave earphone, determining that the signals meet the master-slave earphone switching condition.

Preferably, in the case that the timestamp of the master earphone is not equal to the timestamp of the slave earphone, the timestamp of the master earphone and the timestamp of the slave earphone are not equal to 0, and the timestamp of the master earphone is earlier than the timestamp of the slave earphone, the method further includes: controlling a speaker of the slave earphone to output a first prompt voice.

Preferably, before controlling the master earphone to operate in the slave earphone mode and controlling the slave earphone to operate in the master earphone mode, the method further includes: controlling a speaker of the slave earphone to output a second prompt voice.

To solve the above technical problems, a device for switching a master earphone with a slave earphone of TWS earphones in a call scenario is further provided according to the present disclosure. The device includes an obtaining module, a determination module, and a switching module. The obtaining module is configured to obtain a signal indicating a position change of the master earphone being worn relative to a wearing part of the master earphone and a signal indicating a position change of the slave earphone being worn relative to a wearing part of the slave earphone. The determination module is configured to determine whether the signals meet a master-slave earphone switching condition. The switching module is configured to, in a case that the determination module determines that the signals meet the master-slave earphone switching condition, control the master earphone to operate in a slave earphone mode and control the slave earphone to operate in a master earphone mode.

To solve the above technical problems, a device for switching a master earphone with a slave earphone of TWS earphones in a call scenario is further provided according to the present disclosure. The device includes a memory and a processor. The memory stores a computer program. The processor is configured to perform, when executing the computer program, the method for switching a master earphone with a slave earphone of TWS earphones in a call scenario.

To solve the above technical problems, a computer readable storage medium is further provided according to the present disclosure. The computer readable storage medium stores a computer program. The computer program, when executed by a processor, causes the processor to perform the method for switching a master earphone with a slave earphone of TWS earphones in a call scenario.

In the method for switching a master earphone with a slave earphone of TWS earphones in a call scenario according to the present disclosure, a signal indicating a position change of the master earphone being worn relative to a wearing part of the master earphone and a signal indicating a position change of the slave earphone being worn relative to a wearing part of the slave earphone are obtained; it is determined whether the signals meet a master-slave earphone switching condition; and in a case that the signals meet the master-slave earphone switching condition, the master earphone is controlled to operate in a slave earphone mode and the slave earphone is controlled to operate in a master earphone mode. It can be seen that with the technical solutions according to the present disclosure, in a case that two users respectively wear the master earphone and the slave earphone of the TWS earphones, the two users can perform certain operations to generate signals meeting the master-slave earphone switching condition to perform switching between the master earphone with the slave earphone, so that the two users can simultaneously receive voices from speakers and speak in turn, truly realizing a multi-person conference call, and thereby improving the user experience.

In addition, the device for switching a master earphone with a slave earphone of TWS earphones in a call scenario and the medium correspond to the method described above, and with which the above effects can also be achieved.

BRIEF DESCRIPTION OF THE DRAWINGS

In order to more clearly describe the embodiments of the present disclosure, the drawings to be used in the embodiments of the present disclosure are briefly described hereinafter. It is apparent that the drawings described below show merely some embodiments of the present disclosure, and those skilled in the art may obtain other drawings from the provided drawings without any creative effort.

DETAILED DESCRIPTION OF EMBODIMENTS

Hereafter, the technical solutions in the embodiments of the present disclosure are described clearly and completely in conjunction with the drawings in the embodiments of the present disclosure. It is apparent that the described embodiments are only some embodiments of the present disclosure, rather than all embodiments. Any other embodiments obtained by those skilled in the art based on the embodiments in the present disclosure without any creative work fall into the protection scope of the present disclosure.

According to the present disclosure, a method and a device for switching a master earphone with a slave earphone of TWS earphones in a call scenario, and a medium are provided.

In order to make the person skilled in the art better understand the solutions according to the present disclosure, the present disclosure is further described in detail below in conjunction with the drawings and embodiments.

It should be noted that for a pair of TWS headphones, a master earphone of the TWS headphones is relative to a slave earphone of the TWS headphones. That is, a current master earphone may serve as a slave earphone after switching, and a current slave earphone may serve as a master earphone after switching. In addition, the method for switching a master earphone with a slave earphone of TWS earphones in a call scenario according to the present disclosure may be performed by the master earphone or by the slave earphone. Specifically, the method may be performed by an MCU of the master earphone or an MCU of the slave earphone. Generally, since the master earphone has higher authority, the method is performed by the MCU of the master earphone.

Figure 1:
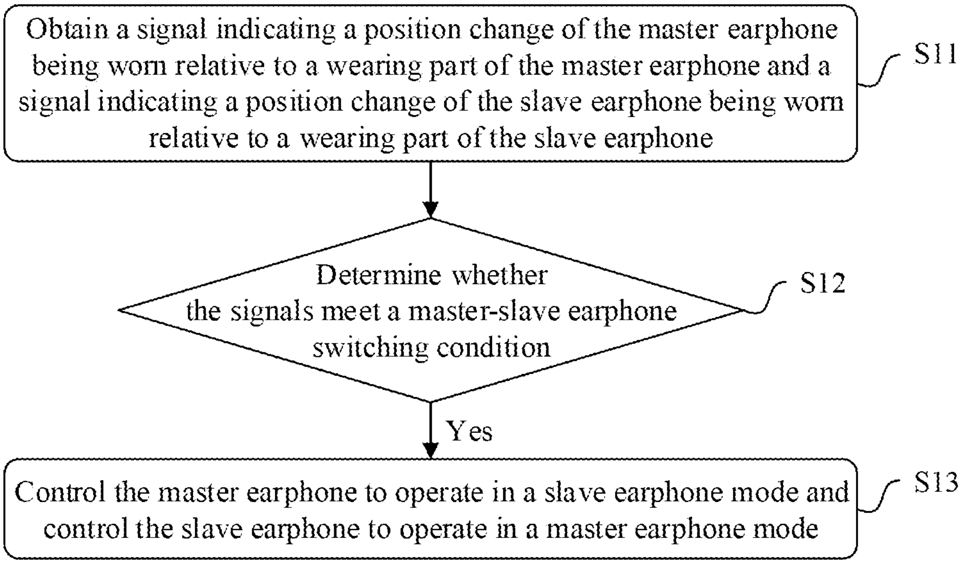
FIG. 1 is a flowchart of a method for switching a master earphone with a slave earphone of TWS earphones in a call scenario according to an embodiment of the present disclosure.

FIG. 1 is a flowchart of a method for switching a master earphone with a slave earphone of TWS earphones in a call scenario according to an embodiment of the present disclosure. As shown in FIG. 1, the method includes the following steps S11 to S13.

In step S11, a signal indicating a position change of the master earphone being worn relative to a wearing part of the master earphone and a signal indicating a position change of the slave earphone being worn relative to a wearing part of the slave earphone are obtained.

The master earphone and the slave earphone of the TWS earphones may be worn by one user or by two users. Since it is unnecessary to perform switching between the master earphone and the slave earphone in a case that the master earphone and the slave earphone are worn by one user, the switching between the master earphone and the slave earphone according to the present disclosure is only performed in a case that the master earphone and the slave earphone of the TWS earphones are respectively worn by two users. No matter whether the TWS earphones are worn by a same user or different users, each of the master earphone and the slave earphone has a wearing part. In this step, a signal indicating a position change of the master earphone relative to the wearing part of the master earphone is obtained, and a signal indicating a position change of the slave earphone relative to the wearing part of the slave earphone is obtained. The position change of the master earphone relative to the wearing part may be a position change of the entire master earphone relative to the wearing part or a position change of a contact surface, between the master earphone and the wearing part, relative to the wearing part. Similarly, the position change of the slave earphone relative to the wearing part may be a position change of the entire slave earphone relative to the wearing part or a position change of a contact surface, between the slave earphone and the wearing part, relative to the wearing part.

It should be noted that in the embodiment, the signals respectively indicate the position change of the master earphone relative to the wearing part of the master earphone and the position change of the slave earphone relative to the wearing part of the slave earphone. Therefore, the signals may include any signals indicating the position changes of the master earphone and the slave earphone relative to the wearing parts, and are not limited to signals of positions. For example, the signal may be generated based on a sound made by the user wearing the master earphone or by the user wearing the slave earphone. Specifically, when a user makes a sound, facial bones of the user may be driven to vibrate, causing the position change of the primary earphone relative to the wearing part of the master earphone or the position change of the slave earphone relative to the wearing part of the slave earphone. Therefore, when the user makes a sound, a timestamp and an offset of the master earphone may both be used as the signal indicating the position change of the master earphone relative to the wearing part of the master earphone, and a timestamp and an offset of the slave earphone may both be used as the signal indicating the position change of the slave earphone relative to the wearing part of the slave earphone. In addition to the timestamp and the offset, other types of signals may be used, which are not limited in the embodiment. It should be understood that, although the above two types of signals are generated by making a sound, the signals may also be generated by tapping in other embodiments, that is, the signals may be generated by the user tapping the master earphone or the slave earphone.

In step S12, it is determined whether the signals meet a master-slave earphone switching condition. In a case that the signals meet the master-slave earphone switching condition, proceed to S12.

It should be noted that in this step, the master-slave earphone switching condition is not limited. The master-slave earphone switching condition may be pre-stored in the memory of the TWS earphones, and is called when it is required to perform determination. For different master-slave earphone switching conditions, the above determination process will be performed by different devices. Based on different types of signals, the master-slave earphone switching condition is different. For example, in an embodiment, if the type of the signal is independent with respect to the master-slave earphone switching condition, the determination process may be respectively performed in the master earphone and the slave earphone, and then determination results are transmitted to the MCU of the master earphone (taking the MCU as an execution body of the method as an example). Alternatively, in another embodiment, if the type of the signal is interdependent with respect to the master-slave earphone switching condition, the signal of the slave earphone may be transmitted to the MCU of the master earphone (taking the MCU as an execution body of the method as an example), so that the MCU of the master earphone performs determination based on the signal of the master earphone and the signal of the slave earphone.

Taking the signals as the timestamps and the offsets as an example, since it is required to compare the timestamp of the master earphone with the timestamp of the slave earphone, the timestamp of the master earphone and the timestamp of the slave earphone are interdependent. Similarly, since it is required to compare the offset of the master earphone with the offset of the slave earphone, the offset of the master earphone and the offset of the slave earphone are interdependent. Accordingly, after collecting the timestamp and the offset, the slave earphone transmits the timestamp and the offset to the MCU of the master earphone, so that the MCU of the master earphone performs determination based on the timestamp and the offset of the master earphone and the timestamp and the offset of the slave earphone to determine whether the signals meet the master-slave earphone switching condition.

In step S13, the master earphone is controlled to operate in a slave earphone mode, the slave earphone is controlled to operate in a master earphone mode.

In an embodiment, in a case that the signals meet the master-slave earphone switching condition, switching is performed between a current master earphone and a current slave earphone. For example, in a case that the user A wears a master earphone and user B wears a slave earphone, then after switching, the master earphone worn by the user A is switched to serve as the slave earphone and the slave earphone worn by the user B wears is switched to serve as the master earphone. The difference between the master earphone mode and the slave earphone mode is that whether the microphone is turned on. Before switching, the microphone of the user A is in an on state and the voice of the user A can be collected, and the microphone of the user B is in an off state and the voice of the user B cannot be collected. After switching, the microphone of the user A is turned off and the voice of the user A cannot be collected, and the microphone of the user B is turned on and the voice of the user B can be collected.

It should be understood that after switching, if the TWS earphones are still in the call scenario, steps S10 to S12 are performed. In a case that the signals meet the master-slave earphone switching condition again, switching is performed, so that the user A and the user B speak in turn.

It should be understood that the switching may be performed based on communication between the master earphone and the slave earphone. In the communication, a switching time instant is transmitted. Switching is performed between the master earphone and the slave earphone at the switching time instant.

In the method for switching a master earphone with a slave earphone of TWS earphones in a call scenario according to the embodiments, a signal indicating a position change of the master earphone being worn relative to a wearing part of the master earphone and a signal indicating a position change of the slave earphone being worn relative to a wearing part of the slave earphone are obtained; it is determined whether the signals meet a master-slave earphone switching condition; and in a case that the signals meet the master-slave earphone switching condition, the master earphone is controlled to operate in a slave earphone mode and the slave earphone is controlled to operate in a master earphone mode. It can be seen that with the technical solutions according to the embodiments, in a case that two users respectively wear the master earphone and the slave earphone of the TWS earphones, the two users can perform certain operations to generate signals meeting the master-slave earphone switching condition to perform switching between the master earphone with the slave earphone, so that the two users can simultaneously receive voices from speakers and speak in turn, truly realizing a multi-person conference call, and thereby improving the user experience.

In the above embodiments, the type of the signals and how to determine whether the signals meet the master-slave earphone switching condition are not limited. Hereinafter, three embodiments are provided for illustration.

First Embodiment

Figure 2:
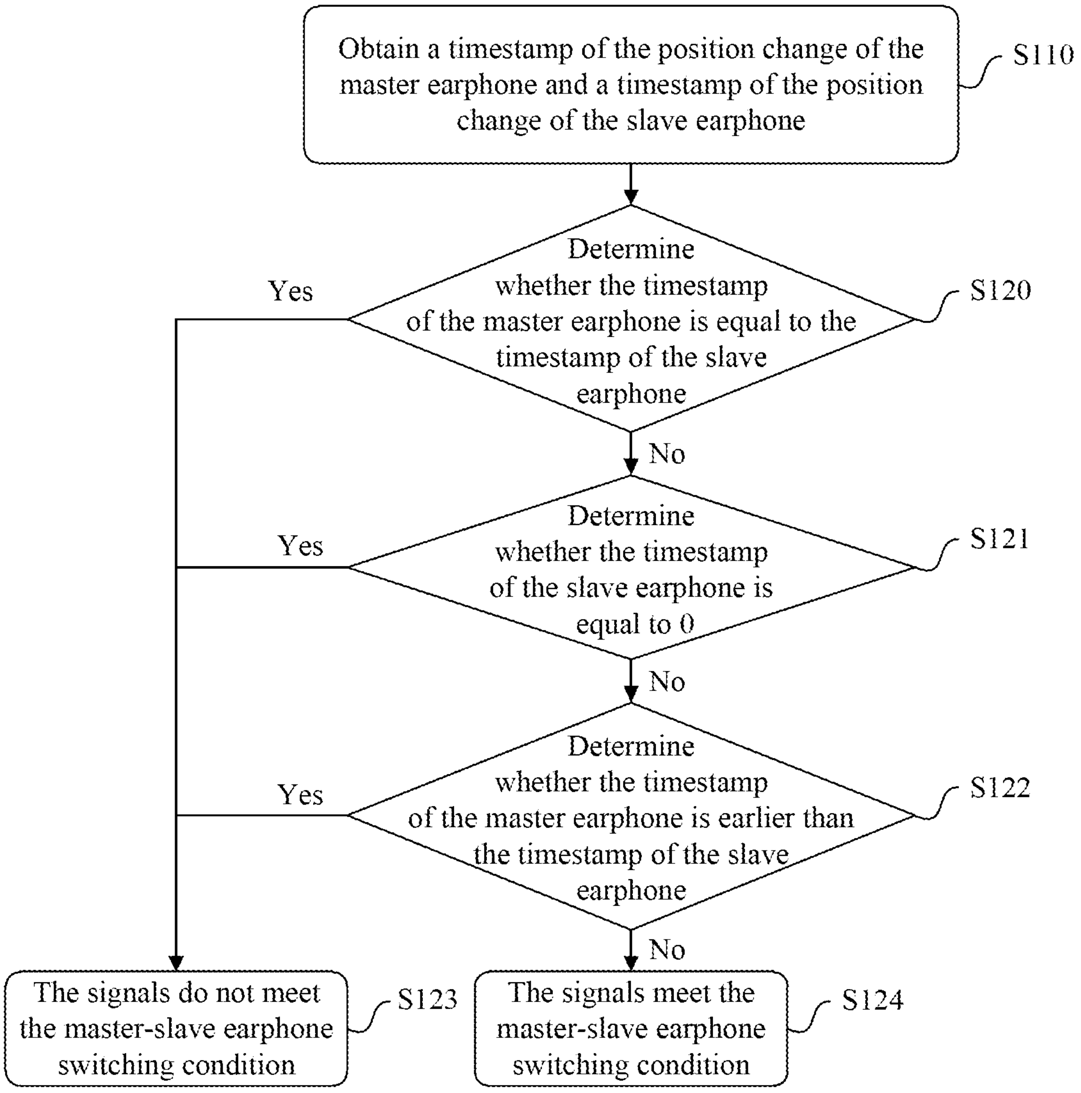
FIG. 2 is a flowchart of a method for switching a master earphone with a slave earphone of TWS earphones in a call scenario according to another embodiment of the present disclosure.

FIG. 2 is a flowchart of a method for switching a master earphone with a slave earphone of TWS earphones in a call scenario according to another embodiment of the present disclosure. On the basis of the above embodiments, step S11 includes the following step S110.

In step S110, a timestamp of the position change of the master earphone and a timestamp of the position change of the slave earphone are obtained.

In an embodiment, in addition to devices such as the MCU, the speaker and the microphone, each of the master earphone and the slave earphone may further include a bone voiceprint sensor, so that the timestamp may be obtained by the bone voiceprint sensor. Specifically, the bone voiceprint sensor collects a timestamp corresponding to a sound. When the user wearing the master earphone or the slave earphone speaks, the facial bones of the user vibrate, then the bone voiceprint sensor collect a signal and records a corresponding timestamp. For example, the timestamp of the master earphone is represented by T_master, and the timestamp of the slave earphone is represented by T_slave. By default, the timestamp is equal to 0 in a case that the user does not speak. That is, T_master is equal to 0 in a case that the user wearing the master earphone does not speak, and T_slave is equal to 0 in a case that the user wearing the slave earphone does not speak.

It should be understood that, it may be determined whether a user is speaking by comparing the timestamp of the master earphone and the timestamp of the slave earphone, and then it is determined whether the master-slave earphone switching condition is met. For example, in a scenario in which the user A and the user B are participating in a multi-person teleconference by using a pair of TWS headphones. In a case the user A is speaking and the user B wants to speak, the timestamp of the master earphone and the timestamp of the slave earphone are not equal to 0 if the user B starts to speak. If switching is performed in this case, the user A has not finished speaking, resulting in poor user experience. Therefore, how to set the master-slave earphone switching condition directly affects the experience of the two users.

In order to further improve the user experience, the process of determining whether the signals meet the master-slave earphone switching condition includes the following cases.

(1) In a case that the timestamp of the master earphone is equal to the timestamp of the slave earphone, it is determined that the signals do not meet the master-slave earphone switching condition. In this case, the master earphone and the slave earphone are worn by one user.

(2) In a case that the timestamp of the master earphone is not equal to the timestamp of the slave earphone and the timestamp of the slave earphone is equal to 0, it is determined that the signals do not meet the master-slave earphone switching condition. In this case, the master earphone and the slave earphone are worn by different users, and the user wearing the slave earphone does not speak.

(3) In a case that the timestamp of the master earphone is not equal to the timestamp of the slave earphone, the timestamp of the slave earphone is not equal to 0 and the timestamp of the master earphone is earlier than the timestamp of the slave earphone, it is determined that the signals do not meet the master-slave earphone switching condition. In this case, the master earphone and the slave earphone are worn by different users, and the user wearing the master earphone speaks first.

(4) In a case that the timestamp of the master earphone is not equal to the timestamp of the slave earphone, the timestamp of the slave earphone is not equal to 0 and the timestamp of the master earphone is later than the timestamp of the slave earphone, it is determined that the signals meet the master-slave earphone switching condition. In this case, the master earphone and the slave earphone are worn by different users, and the user wearing the slave earphone speaks first.

In order to make those skilled in the art more clear about the processes in the present disclosure, a specific determination method is provided below. It should be understood that FIG. 2 only shows an embodiment, rather than the only embodiment. As long as the above results can be achieved, the determination steps may be adjusted. As shown in FIG. 2, step S12 includes the following steps S120 to S124.

In step S120, it is determined whether the timestamp of the master earphone is equal to the timestamp of the slave earphone. In a case that the timestamp of the master earphone is equal to the timestamp of the slave earphone, proceed to S123. In a case that the timestamp of the master earphone is not equal to the timestamp of the slave earphone, proceed to S121.

In step S121, it is determined whether the timestamp of the slave earphone is equal to 0. In a case that the timestamp of the slave earphone is equal to 0, proceed to S123. In a case that the timestamp of the slave earphone is not equal to 0, proceed to S122.

In step S122, it is determined whether the timestamp of the master earphone is earlier than the timestamp of the slave earphone. In a case that the timestamp of the master earphone is earlier than the timestamp of the slave earphone, proceed to S123. In a case that the timestamp of the master earphone is not earlier than the timestamp of the slave earphone, proceed to S124.

In step S123, the signals do not meet the master-slave earphone switching condition.

In step S124, the signals meet the master-slave earphone switching condition.

In the determination method according to the embodiment, the determination result is obtained by comparing the timestamp of the master earphone and the timestamp of the slave earphone.

Second Embodiment

Figure 3:
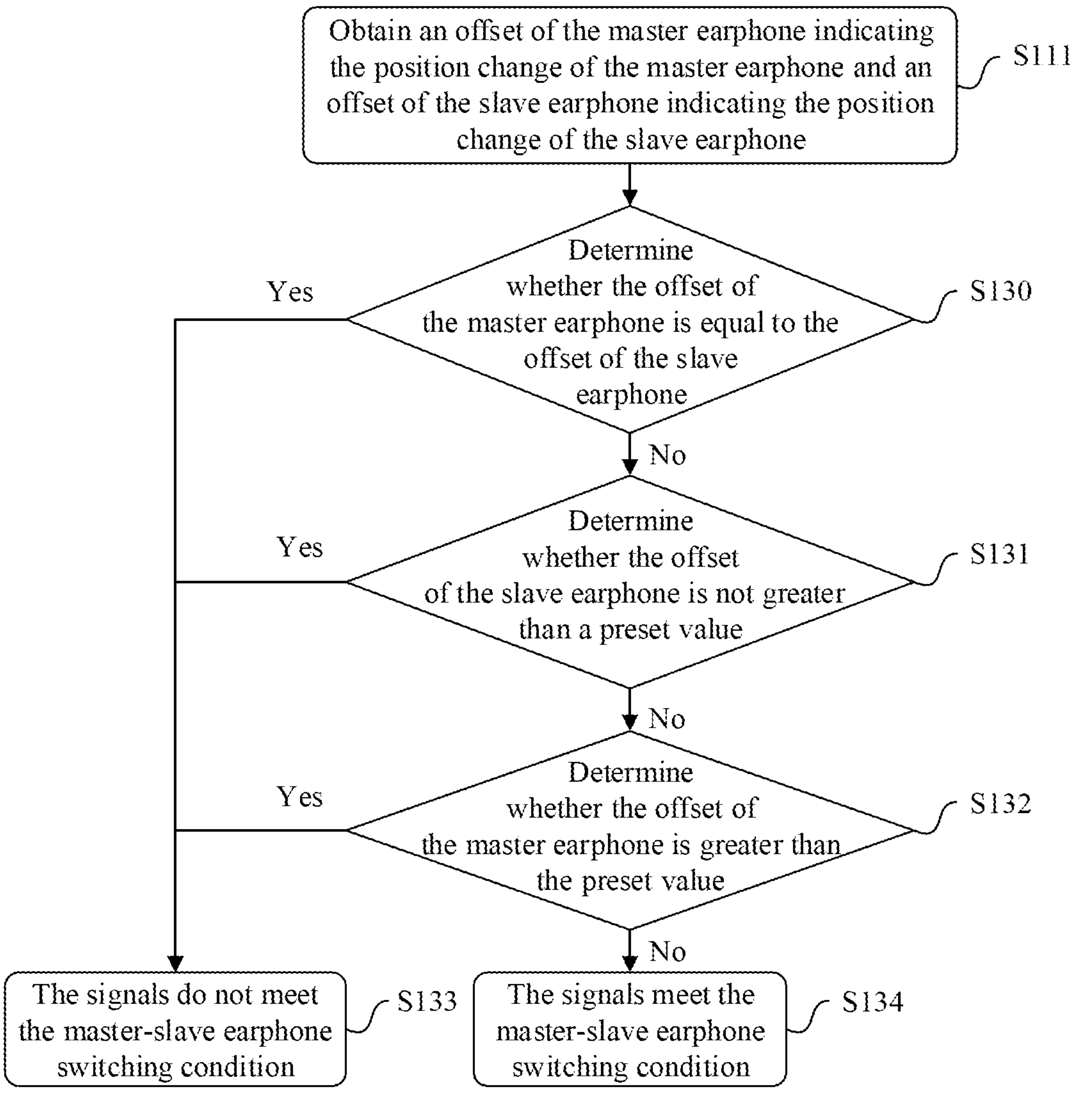
FIG. 3 is a flowchart of a method for switching a master earphone with a slave earphone of TWS earphones in a call scenario according to another embodiment of the present disclosure.

FIG. 3 is a flowchart of a method for switching a master earphone with a slave earphone of TWS earphones in a call scenario according to another embodiment of the present disclosure. On the basis of the above embodiments, step S11 includes the following step S111.

In step S111, an offset of the master earphone indicating the position change of the master earphone and an offset of the slave earphone indicating the position change of the slave earphone are obtained.

Further, in an embodiment, in addition to devices such as the MCU, the speaker and the microphone, each of the master earphone and the slave earphone may further include a gravity accelerometer or a gyroscope, for example, may include a three-axis gravity accelerometer. Specifically, the offset is obtained by the gravity accelerometer. When the user wearing the master earphone or the slave earphone speaks, the facial bones of the user vibrate, causing an offset of the master earphone or an offset of the slave earphone. The gravity accelerometer records a corresponding acceleration, and an offset is calculated based on the acceleration. For example, the offset of the master earphone is represented by Data_master, and the offset of the slave earphone is represented by Data_slave. By default, the offset is equal to 0 in a case that the user does not speak. That is, Data_master is equal to 0 in a case that the user wearing the master earphone does not speak, and Data_slave is equal to 0 in a case that the user wearing the slave earphone does not speak.

Specifically, the offsets in the embodiments are angular offsets, and the angular offsets are obtained by using the following equations:

$$\alpha_1=\arctan(Kx/\mathrm{squr}(Ky*Ky+Kz*Kz))$$

$$\beta_1=\arctan(Ky/\mathrm{squr}(Kx*Kx+Kz*Kz))$$

$$\gamma_1=\arctan(Kz/\mathrm{squr}(Kx*Kx+Ky*Ky))$$

where $\alpha_1$ represents a pitch angle of a Gsensor along an X axis, $\beta_1$ represents a side slip angle of the Gsensor along a Y axis, $\gamma_1$ represents a yaw angle of the Gsensor along a Z axis, and $K_x$, $K_y$, and $K_z$ represent accelerations respectively along the X axis, Y axis and Z axis.

It should be understood that it may be determined whether a user is speaking by comparing the offset of the master earphone and the offset of the slave earphone, and then it is determined whether the master-slave earphone switching condition is met. For example, in a scenario in which the user A and the user B are participating in a multi-person teleconference by using a pair of TWS headphones. In a case the user A is speaking and the user B also wants to speak, the timestamp of the master earphone and the timestamp of the slave earphone are not equal to 0 if the user B starts to speak. If switching is performed in this case, the user A has not finished speaking, resulting in poor user experience. Therefore, how to set the master-slave earphone switching condition directly affects the experience of the two users.

In order to further improve the user experience, the process of determining whether the signals meet the master-slave earphone switching condition includes the following cases.

(1) In a case that the offset of the master earphone is equal to the offset of the slave earphone, it is determined that the signals do not meet the master-slave earphone switching condition. In this case, the master earphone and the slave earphone are worn by one user.

(2) In a case that the offset of the master earphone is not equal to the offset of the slave earphone and the offset of the slave earphone is not greater than a preset value, it is determined that the signals do not meet the master-slave earphone switching condition. In this case, the master earphone and the slave earphone are worn by different users, and the user wearing the slave earphone does not speak.

(3) In a case that the offset of the master earphone is not equal to the offset of the slave earphone, the offset of the slave earphone is greater than preset value and the offset of the master earphone is greater than the preset value, it is determined that the signals do not meet the master-slave earphone switching condition. In this case, the master earphone and the slave earphone are worn by different users, and the user wearing the master earphone is speaking.

(4) In a case that the offset of the master earphone is not equal to the offset of the slave earphone, the offset of the slave earphone is greater than a preset value and the offset of the master earphone is not greater than the preset value, it is determined that the signals meet the master-slave earphone switching condition. In this case, the master earphone and the slave earphone are worn by different users, the user wearing the slave earphone is speaking, and the user wearing the master earphone does not speak.

In order to make those skilled in the art more clear about the processes in the present disclosure, a specific determination method is provided below. It should be understood that FIG. 3 only shows an embodiment, rather than the only embodiment. As long as the above results can be achieved, the determination steps may be adjusted. As shown in FIG. 3, step S12 includes the following steps S130 to S134.

In step S130, it is determined whether the offset of the master earphone is equal to the offset of the slave earphone. In a case that the offset of the master earphone is equal to the offset of the slave earphone, proceed to S133. In a case that the offset of the master earphone is not equal to the offset of the slave earphone, proceed to S131.

In step S131, it is determined whether the offset of the slave earphone is not greater than a preset value. In a case that the offset of the slave earphone is not greater than the preset value, proceed to S133. In a case that the offset of the slave earphone is greater than the preset value, proceed to S132.

In step S132, it is determined whether the offset of the master earphone is greater than the preset value. In a case that the offset of the master earphone is greater than the preset value, proceed to S133. In a case that the offset of the master earphone is not greater than the preset value, proceed to S134.

In step S133, the signals do not meet the master-slave earphone switching condition.

In step S134, the signals meet the master-slave earphone switching condition.

In the determination method according to the embodiment, the determination result is obtained by comparing the offset of the master earphone and the offset of the slave earphone.

Third Embodiment

Figure 4:
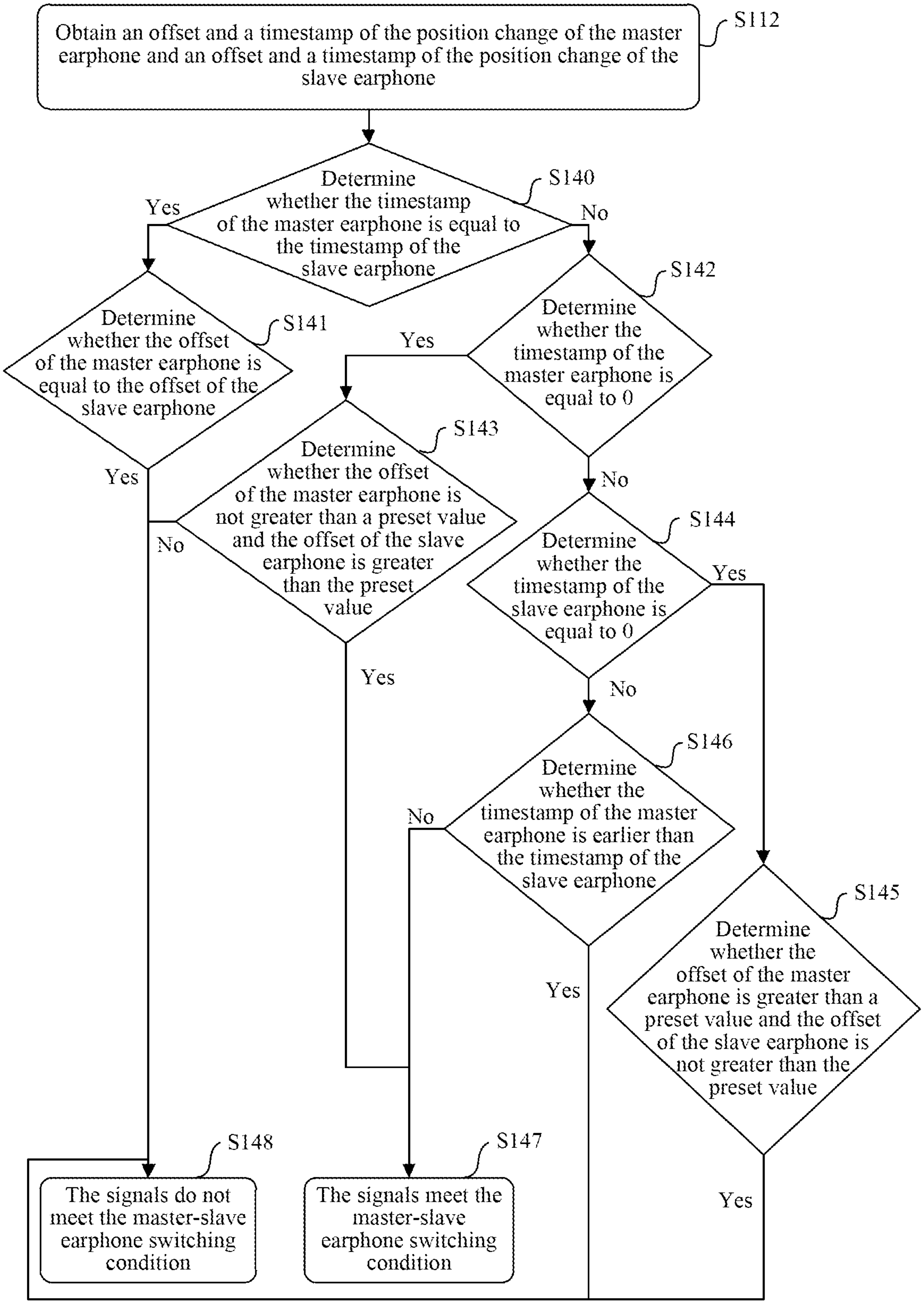
FIG. 4 is a flowchart of a method for switching a master earphone with a slave earphone of TWS earphones in a call scenario according to another embodiment of the present disclosure.

FIG. 4 is a flowchart of a method for switching a master earphone with a slave earphone of TWS earphones in a call scenario according to another embodiment of the present disclosure. On the basis of the above embodiments, step S11 includes the following step S112.

In step S112, an offset and a timestamp of the position change of the master earphone and an offset and a timestamp of the position change of the slave earphone are obtained.

For the descriptions for the offset of the master earphone, the timestamp of the master earphone, the offset of the slave earphone and the timestamp of the slave earphone, one may refer to the above relevant descriptions. In order to further improve the user experience, the process of determining whether the signals meet the master-slave earphone switching condition includes the following cases.

(1) Ina case that the timestamp of the master earphone is equal to the timestamp of the slave earphone and the offset of the master earphone is equal to the offset of the slave earphone, it is determined that the signals do not meet the master-slave earphone switching condition. In this case, the master earphone and the slave earphone are worn by one user.

(2) In a case that the timestamp of the master earphone is not equal to the timestamp of the slave earphone, the timestamp of the master earphone is equal to 0, the offset of the master earphone is less than a preset value, and the offset of the slave earphone is greater than the preset value, it is determined that the signals meet the master-slave earphone switching condition. In this case, the master earphone and the slave earphone are worn by different users, the user wearing the master earphone does not speak, and the user wearing the slave earphone is speaking.

(3) In a case that the timestamp of the master earphone is not equal to the timestamp of the slave earphone, the timestamp of the master earphone is not equal to 0, the timestamp of the slave earphone is equal to 0, the offset of the master earphone is greater than a preset value, and the offset of the slave earphone is less than the preset value, it is determined that the signals do not meet the master-slave earphone switching condition. In this case, the master earphone and the slave earphone are worn by different users, the user wearing the master earphone is speaking, and the user wearing the slave earphone does not speak.

(4) In a case that the timestamp of the master earphone is not equal to the timestamp of the slave earphone, the timestamp of the master earphone and the timestamp of the slave earphone are not equal to 0, and the timestamp of the master earphone is earlier than the timestamp of the slave earphone, it is determined that the signals do not meet the master-slave earphone switching condition. In this case, the master earphone and the slave earphone are worn by different users, the user wearing the master earphone speaks first, and the user wearing the slave earphone speaks later.

(5) In a case that the timestamp of the master earphone is not equal to the timestamp of the slave earphone, the timestamp of the master earphone and the timestamp of the slave earphone are not equal to 0, and the timestamp of the master earphone is later than the timestamp of the slave earphone, it is determined that the signals meet the master-slave earphone switching condition. In this case, the master earphone and the slave earphone are worn by different users, the user wearing the slave earphone speaks first, and the user wearing the master earphone speaks later.

In order to make those skilled in the art more clear about the processes in the present disclosure, a specific determination method is provided below. It should be understood that FIG. 2 only shows an embodiment, rather than the only embodiment. As long as the above results can be achieved, the determination steps may be adjusted. As shown in FIG. 4, the step S12 includes the following steps S140 to S148.

In step 140, it is determined whether the timestamp of the master earphone is equal to the timestamp of the slave earphone. In a case that the timestamp of the master earphone is equal to the timestamp of the slave earphone, proceed to S141. In a case that the timestamp of the master earphone is not equal to the timestamp of the slave earphone, proceed to S142.

In step S141, it is determined whether the offset of the master earphone is equal to the offset of the slave earphone. In a case that the offset of the master earphone is equal to the offset of the slave earphone, proceed to S148.

In step S142, it is determined whether the timestamp of the master earphone is equal to 0. In a case that the timestamp of the master earphone is equal to 0, proceed to S143. In a case that the timestamp of the master earphone is not equal to 0, proceed to S144.

In step S143, it is determined whether the offset of the master earphone is not greater than the preset value and the offset of the slave earphone is greater than the preset value. In a case that the offset of the master earphone is not greater than the preset value and the offset of the slave earphone is greater than the preset value, proceed to S147. In a case that the offset of the master earphone is greater than the preset value or the offset of the slave earphone is not greater than the preset value, proceed to S148.

In step S144, it is determined whether the timestamp of the slave earphone is equal to 0. In a case that the timestamp of the slave earphone is equal to 0, proceed to S145. In a case that the timestamp of the slave earphone is not equal to 0, proceed to S146.

In step S145, it is determined whether the offset of the master earphone is greater than the preset value and the offset of the slave earphone is not greater than the preset value. In a case that the offset of the master earphone is greater than the preset value and the offset of the slave earphone is not greater than the preset value, proceed to S148.

In step S146, it is determined whether the timestamp of the master earphone is earlier than the timestamp of the slave earphone. In a case that the timestamp of the master earphone is earlier than the timestamp of the slave earphone, proceed to S148. In a case that the timestamp of the master earphone is not earlier than the timestamp of the slave earphone, proceed to S147.

In step S147, the signals meet the master-slave earphone switching condition.

In step S148, the signals do not meet the master-slave earphone switching condition.

In the determination method according to the embodiment, the timestamp of the master earphone and the timestamp of the slave earphone are compared and the offset of the master earphone and the offset of the slave earphone are compared to prevent the risk of false triggering, thereby further improving the user experience.

Further, the method, after step 148, includes: controlling a speaker of the slave earphone to output a first prompt voice.

It should be understood that in the case that the timestamp of the master earphone is not equal to the timestamp of the slave earphone, the timestamp of the master earphone and the timestamp of the slave earphone are not equal to 0 and the timestamp of the master earphone is earlier than the timestamp of the slave earphone, it indicates that the user wearing the master earphone and the user wearing the slave earphone both want to speak. However, due to that the user wearing the master earphone speaks first and the user wearing the slave earphone speaks later, the first prompt voice is outputted to prompt the user wearing the slave earphone to speak later. The detail prompt voice may be configured according to the actual situations. For example, the prompt voice may be configured as “the other party is speaking, please speak later”. Thus, the user wearing the slave earphone may perform operations after hearing the prompt voice.

On the basis of the above embodiments, after controlling the master earphone to operate in the slave earphone mode and controlling the slave earphone to operate in the master earphone mode, the method further includes: controlling a speaker of the slave earphone to output a second prompt voice.

Since the current slave earphone, before switching, operates in a slave earphone mode, the user wearing the slave earphone may speak after the slave earphone is switched to operate in a master earphone mode. The user may be prompted by the second prompt voice about the switching of the mode.

In the above embodiments, the method for switching a master earphone with a slave earphone of TWS earphones in a call scenario is described in detail. A device for switching a master earphone with a slave earphone of TWS earphones in a call scenario is further provided according to an embodiment of the present disclosure. It should be noted that the device is described from two perspectives, that is, a perspective based on functional modules and a perspective based on hardware.

Figure 5:
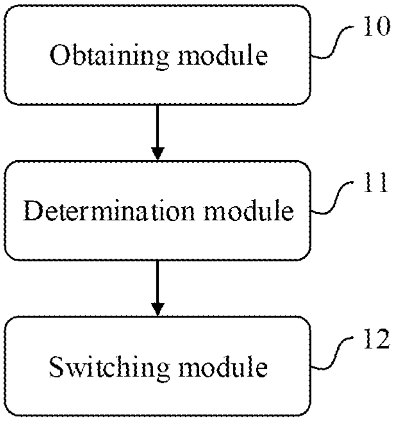
FIG. 5 is a schematic structural diagram of a device for switching a master earphone with a slave earphone of TWS earphones in a call scenario according to an embodiment of the present disclosure.

FIG. 5 is a schematic structural diagram of a device for switching a master earphone with a slave earphone of TWS earphones in a call scenario according to an embodiment of the present disclosure. As shown in FIG. 5, the device includes an obtaining module 10, a determination module 11 and a switching module 12.

The obtaining module 10 is configured to obtain a signal indicating a position change of the master earphone being worn relative to a wearing part of the master earphone and a signal indicating a position change of the slave earphone being worn relative to a wearing part of the slave earphone.

The determination module 11 is configured to determine whether the signals meet a master-slave earphone switching condition.

The switching module 12 is configured to, in a case that the determination module determines that the signals meet the master-slave earphone switching condition, control the master earphone to operate in a slave earphone mode and control the slave earphone to operate in a master earphone mode.

Since the embodiments of the device correspond to the embodiments of the method, the embodiments of the device may refer to the embodiments of the method, which are not repeated herein.

In the method for switching a master earphone with a slave earphone of TWS earphones in a call scenario according to the embodiments, a signal indicating a position change of the master earphone being worn relative to a wearing part of the master earphone and a signal indicating a position change of the slave earphone being worn relative to a wearing part of the slave earphone are obtained; it is determined whether the signals meet a master-slave earphone switching condition; and in a case that the signals meet the master-slave earphone switching condition, the master earphone is controlled to operate in a slave earphone mode and the slave earphone is controlled to operate in a master earphone mode. It can be seen that with the technical solutions according to the embodiments, in a case that two users respectively wear the master earphone and the slave earphone of the TWS earphones, the two users can perform certain operations to generate signals meeting the master-slave earphone switching condition to perform switching between the master earphone with the slave earphone, so that the two users can simultaneously receive voices from speakers and speak in turn, truly realizing a multi-person conference call, and thereby improving the user experience.

Figure 6:
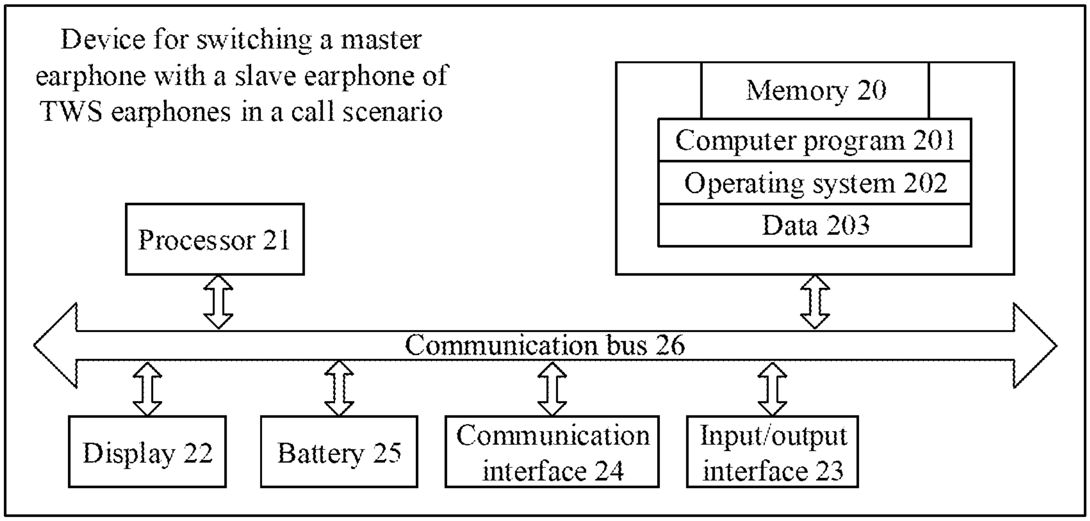
FIG. 6 is a schematic structural diagram of a device for switching a master earphone with a slave earphone of TWS earphones in a call scenario according to an embodiment of the present disclosure.

FIG. 6 is a schematic structural diagram of a device for switching a master earphone with a slave earphone of TWS earphones in a call scenario according to an embodiment of the present disclosure. As shown in FIG. 6, the device includes a memory 20 and a processor 21. The memory 20 stores a computer program. The processor 21 is configured to perform, when executing the computer program, the method for switching a master earphone with a slave earphone of TWS earphones in a call scenario according to any one of the above embodiments.

The processor 21 may include one or more processing cores, such as a 4-core processor and an 8-core processor. The processor 21 may be implemented by using at least one hardware form of digital signal processing (DSP), a field-programmable gate array (FPGA), and a programmable logic array (PLA). The processor 21 may include a main processor and a coprocessor. The main processor is configured to process data in an awake state, and is referred to as a central processing unit (CPU). The coprocessor is a low-power processor for processing data in a standby state. In some embodiments, the processor 21 may be integrated with a graphics processing unit (GPU). The GPU is configured to render and draw content to be displayed by a display screen. In some embodiments, the processor 21 may further include an artificial intelligence (AI) processor. The AI processor is configured to perform calculation operations related to machine learning.

The memory 20 may include one or more computer-readable storage medium. The computer-readable storage medium may be non-transient. The memory 20 may further include a high-speed random access memory and a non-volatile memory, such as one or more magnetic disk storage devices and a flash storage device. In the embodiments according to the present disclosure, the memory 20 at least stores a computer program 201. The computer program, when loaded and executed by the processor 21, causes the processor 21 to perform the method for switching a master earphone with a slave earphone of TWS earphones in a call scenario according to any one of the above embodiments. In addition, the memory 20 may further store resources such as an operating system 202 and data 203, and the storage mode may be a temporary storage mode or a permanent storage mode. The operating system 202 may include Windows, Unix, Linux, and the like.

In some embodiments, the device for switching a master earphone with a slave earphone of TWS earphones in a call scenario may further include a display screen 22, a input/output interface 23, a communication interface 22, a battery 25 and a communication bus 26.

It should be understood by those skilled in the art that, the structure shown in FIG. 6 does not limit the device for switching a master earphone with a slave earphone of TWS earphones in a call scenario, and the device may include more or less components than the components shown in FIG. 6.

A computer readable storage medium is further provided according to an embodiment of in present disclosure. The computer readable storage medium stores a computer program. The computer program, when executed by a processor, causes the processor to perform the method for switching a master earphone with a slave earphone of TWS earphones in a call scenario according to any one of the embodiments.

It should be understood that if the method in the above embodiments is implemented in the form of a software functional unit and is sold and used as an independent product, the method may be stored in a computer readable storage medium. Base on the above understanding, the technical solutions according to the present disclosure essentially or the part that contributes to the conventional technology, or all or a part of the technical solutions may be embodied in the form of a software product. The computer software product is stored in a storage medium and performs all or part of steps of the method described in the above embodiments of the present disclosure. The storage medium includes various kinds of medium that can store program codes, such as a U disk, a mobile hard disk, a read-only memory (ROM), a random access memory (RAM), a magnetic disk, or an optical disk.

The method and device for switching a master earphone with a slave earphone of TWS earphones in a call scenario, and the medium have been described in detail hereinbefore. The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method. It should be noted that improvements and modifications may be made to the present disclosure by those skilled in the art without departing from the concept of the present disclosure. These improvements and modifications shall fall within the scope of the claims of the present disclosure.

It should be further noted that in this specification, the relationship terminologies such as "first" and "second" and the like are only used herein to distinguish one entity or operation from another, rather than to necessitate or imply that the actual relationship or order exists between the entities or operations. Moreover, terms of "include", "comprise" or any other variants are intended to be non-exclusive. Therefore, a process, method, article, or device including multiple elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

The invention claimed is:

1. A method for switching a master earphone with a slave earphone of true wireless stereo (TWS) earphones in a call scenario, comprising:

obtaining a signal indicating a position change of the master earphone being worn relative to a wearing part of the master earphone and a signal indicating a position change of the slave earphone being worn relative to a wearing part of the slave earphone;

determining whether the signals meet a master-slave earphone switching condition; and in a case that the signals meet the master-slave earphone switching condition, controlling the master earphone to operate in a slave earphone mode and controlling the slave earphone to operate in a master earphone mode;

wherein the obtaining a signal indicating a position change of the master earphone being worn relative to a wearing part of the master earphone and a signal indicating a position change of the slave earphone being worn relative to a wearing part of the slave earphone comprises:

obtaining a timestamp of the position change of the master earphone and a timestamp of the position change of the slave earphone, and wherein the determining whether the signals meet the master-slave earphone switching condition comprises:

in a case that the timestamp of the master earphone is equal to the timestamp of the slave earphone, determining that the signals do not meet the master-slave earphone switching condition;

in a case that the timestamp of the master earphone is not equal to the timestamp of the slave earphone and the timestamp of the slave earphone is equal to 0, determining that the signals do not meet the master-slave earphone switching condition;

in a case that the timestamp of the master earphone is not equal to the timestamp of the slave earphone, the timestamp of the slave earphone is not equal to 0 and the timestamp of the master earphone is earlier than the timestamp of the slave earphone, determining that the signals do not meet the master-slave earphone switching condition; and in a case that the timestamp of the master earphone is not equal to the timestamp of the slave earphone, the timestamp of the slave earphone is not equal to 0 and the timestamp of the master earphone is later than the timestamp of the slave earphone, determining that the signals meet the master-slave earphone switching condition.

2. A device for switching a master earphone with a slave earphone of true wireless stereo (TWS) earphones in a call scenario, comprising:

a memory, storing a computer program; and a processor, configured to perform, when executing the computer program, the method for switching a master earphone with a slave earphone of TWS earphones in a call scenario according to claim 1.

3. A non-transitory computer readable storage medium storing a computer program, wherein the computer program, when executed by a processor, causes the processor to perform the method for switching a master earphone with a slave earphone of true wireless stereo (TWS) earphones in a call scenario according to claim 1.

4. A method for switching a master earphone with a slave earphone of true wireless stereo (TWS) earphones in a call scenario, comprising:

obtaining a signal indicating a position change of the master earphone being worn relative to a wearing part of the master earphone and a signal indicating a position change of the slave earphone being worn relative to a wearing part of the slave earphone;

determining whether the signals meet a master-slave earphone switching condition; and in a case that the signals meet the master-slave earphone switching condition, controlling the master earphone to operate in a slave earphone mode and controlling the slave earphone to operate in a master earphone mode;

wherein the obtaining a signal indicating a position change of the master earphone being worn relative to a wearing part of the master earphone and a signal indicating a position change of the slave earphone being worn relative to a wearing part of the slave earphone comprises:

obtaining an offset of the master earphone indicating the position change of the master earphone and an offset of the slave earphone indicating the position change of the slave earphone, and wherein the determining whether the signals meet the master-slave earphone switching condition comprises:

in a case that the offset of the master earphone is equal to the offset of the slave earphone, determining that the signals do not meet the master-slave earphone switching condition;

in a case that the offset of the master earphone is not equal to the offset of the slave earphone and the offset of the slave earphone is not greater than a preset value, determining that the signals do not meet the master-slave earphone switching condition;

in a case that the offset of the master earphone is not equal to the offset of the slave earphone, the offset of the slave earphone is greater than a preset value and the offset of the master earphone is greater than the preset value, determining that the signals do not meet the master-slave earphone switching condition; and in a case that the offset of the master earphone is not equal to the offset of the slave earphone, the offset of the slave earphone is greater than a preset value and the offset of the master earphone is not greater than the preset value, determining that the signals meet the master-slave earphone switching condition.

5. A device for switching a master earphone with a slave earphone of true wireless stereo (TWS) earphones in a call scenario, comprising:

a memory, storing a computer program; and a processor, configured to perform, when executing the computer program, the method for switching a master earphone with a slave earphone of TWS earphones in a call scenario according to claim 4.

6. A non-transitory computer readable storage medium storing a computer program, wherein the computer program, when executed by a processor, causes the processor to perform the method for switching a master earphone with a slave earphone of true wireless stereo (TWS) earphones in a call scenario according to claim 4.

7. A method for switching a master earphone with a slave earphone of true wireless stereo (TWS) earphones in a call scenario, comprising:

obtaining a signal indicating a position change of the master earphone being worn relative to a wearing part of the master earphone and a signal indicating a position change of the slave earphone being worn relative to a wearing part of the slave earphone;

determining whether the signals meet a master-slave earphone switching condition; and in a case that the signals meet the master-slave earphone switching condition, controlling the master earphone to operate in a slave earphone mode and controlling the slave earphone to operate in a master earphone mode;

wherein the obtaining a signal indicating a position change of the master earphone being worn relative to a wearing part of the master earphone and a signal indicating a position change of the slave earphone being worn relative to a wearing part of the slave earphone comprises:

obtaining an offset and a timestamp of the position change of the master earphone and an offset and a timestamp of the position change of the slave earphone, and wherein the determining whether the signals meet a master-slave earphone switching condition comprises:

in a case that the timestamp of the master earphone is equal to the timestamp of the slave earphone and the offset of the master earphone is equal to the offset of the slave earphone, determining that the signals do not meet the master-slave earphone switching condition;

in a case that the timestamp of the master earphone is not equal to the timestamp of the slave earphone, the timestamp of the master earphone is equal to 0, the offset of the master earphone is less than a preset value, and the offset of the slave earphone is greater than the preset value, determining that the signals meet the master-slave earphone switching condition;

in a case that the timestamp of the master earphone is not equal to the timestamp of the slave earphone, the timestamp of the master earphone is not equal to 0, the timestamp of the slave earphone is equal to 0, the offset of the master earphone is greater than a preset value, and the offset of the slave earphone is less than the preset value, determining that the signals do not meet the master-slave earphone switching condition;

in a case that the timestamp of the master earphone is not equal to the timestamp of the slave earphone, the timestamp of the master earphone and the timestamp of the slave earphone are not equal to 0, and the timestamp of the master earphone is earlier than the timestamp of the slave earphone, determining that the signals do not meet the master-slave earphone switching condition; and in a case that the timestamp of the master earphone is not equal to the timestamp of the slave earphone, the timestamp of the master earphone and the timestamp of the slave earphone are not equal to 0, and the timestamp of the master earphone is later than the timestamp of the slave earphone, determining that the signals meet the master-slave earphone switching condition.

8. The method according to claim 7, wherein in the case that the timestamp of the master earphone is not equal to the timestamp of the slave earphone, the timestamp of the master earphone and the timestamp of the slave earphone are not equal to 0, and the timestamp of the master earphone is earlier than the timestamp of the slave earphone, the method further comprises:

controlling a speaker of the slave earphone to output a first prompt voice.

9. The method according to claim 8, wherein before controlling the master earphone to operate in the slave earphone mode and controlling the slave earphone to operate in the master earphone mode, the method further comprises:

controlling a speaker of the slave earphone to output a second prompt voice.

10. A device for switching a master earphone with a slave earphone of true wireless stereo (TWS) earphones in a call scenario, comprising:

a memory, storing a computer program; and a processor, configured to perform, when executing the computer program, the method for switching a master earphone with a slave earphone of TWS earphones in a call scenario according to claim 7.

11. A non-transitory computer readable storage medium storing a computer program, wherein the computer program, when executed by a processor, causes the processor to perform the method for switching a master earphone with a slave earphone of true wireless stereo (TWS) earphones in a call scenario according to claim 7.

* * * * *